United States Patent
Hwang et al.

(10) Patent No.: US 8,654,159 B2
(45) Date of Patent: Feb. 18, 2014

(54) IMAGE DISPLAY DEVICE AND DRIVING METHOD THEREOF

(75) Inventors: Kwangjo Hwang, Anyang-si (KR); Donghoon Lee, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 207 days.

(21) Appl. No.: 13/326,468

(22) Filed: Dec. 15, 2011

(65) Prior Publication Data

US 2012/0154467 A1    Jun. 21, 2012

(30) Foreign Application Priority Data

Dec. 20, 2010   (KR) .................. 10-2010-0130858

(51) Int. Cl.
   *G09G 5/02*   (2006.01)
(52) U.S. Cl.
   USPC ........................................ 345/694
(58) Field of Classification Search
   None
   See application file for complete search history.

(56) References Cited

U.S. PATENT DOCUMENTS

| 8,421,709 | B2 | 4/2013 | Kang | |
|---|---|---|---|---|
| 2007/0242068 | A1* | 10/2007 | Han et al. | 345/427 |
| 2009/0046216 | A1* | 2/2009 | Chen | 349/48 |
| 2009/0207115 | A1 | 8/2009 | Kim | |
| 2010/0265230 | A1* | 10/2010 | Kang | 345/211 |
| 2010/0289884 | A1* | 11/2010 | Kang | 348/58 |

FOREIGN PATENT DOCUMENTS

| CN | 101867836 A | 10/2010 |
|---|---|---|
| JP | 2002-185983 A | 6/2002 |

* cited by examiner

*Primary Examiner* — Christopher R Lamb
(74) *Attorney, Agent, or Firm* — Birch, Stewart, Kolasch & Birch, LLP

(57) ABSTRACT

An image display device and a method of driving the same capable of improving visibility of both a 2D image and a 3D image and preventing a reduction in a luminance of the 2D image when implementing the 2D image are discussed. The image display device in one embodiment includes a display panel including a plurality of subpixels to selectively configure a 2D image and a 3D image, and a patterned retarder separating the light incident from the display panel into a first polarization component and a second polarization component, wherein the subpixel includes a main subpixel, a subsidiary subpixel and a control TFT for controlling a display gray level of the subsidiary subpixel.

16 Claims, 19 Drawing Sheets

(a)

(b)

IMAGE DISPLAY DEVICE AND DRIVING METHOD THEREOF

This application claims the benefit of Korean Patent Application No. 10-2010-0130858 filed on Dec. 20, 2010, which is incorporated herein by reference for all purposes as if fully set forth herein.

BACKGROUND OF THE INVENTION

1. Field of the Invention

Embodiments of the invention relate to an image display device capable of implementing a two-dimensional plane image (hereinafter referred to as '2D image') and a three-dimensional stereoscopic image (hereinafter referred to as '3D image').

2. Discussion of the Related Art

An image display device implements a 3D image using a stereoscopic technique or an autostereoscopic technique.

The stereoscopic technique, which uses a parallax image between left and right eyes of a user with a high stereoscopic effect, includes a glasses type method and a non-glasses type method, both of which have been put to practical use. In the glasses type method, the parallax image between the left and right eyes is displayed on a direct-view display or a projector through a change in a polarization direction of the parallax image or in a time-division manner, and a stereoscopic image is implemented using polarization glasses or liquid crystal shutter glasses. In the non-glasses type method, an optical plate such as a parallax barrier for separating an optical axis of the parallax image between the left and right eyes is generally installed in front of or behind a display screen.

As shown in FIG. 1, the image display device using the glasses type method may include a patterned retarder 5 for converting polarization characteristics of light incident on polarization glasses 6 on a display panel 3. In the glasses type method, a left eye image L and a right eye image R are alternately displayed on the display panel 3, and the polarization characteristics of light incident on the polarization glasses 6 are converted by the patterned retarder 5. Through such an operation of the image display device using the glasses type method, the left eye image L and the right eye image R may be spatially divided, thereby implementing a 3D image. In FIG. 1, a reference numeral 1 denotes a backlight unit providing light to the display panel 3, and reference numerals 2 and 4 denote polarizing plates respectively attached to upper and lower surfaces of the display panel 3 so as to select linear polarization.

In the glasses type method, visibility of the 3D image is reduced because of crosstalk generated at locations of vertical viewing angle. As a result, in the general glasses type method, a range of the vertical viewing angle, at which the user can view the 3D image with the good image quality, is very narrow. The crosstalk is generated because the left eye image L passes through an area of a right eye patterned retarder as well as an area of a left eye patterned retarder and the right eye image R passes through the area of the left eye patterned retarder as well as the area of the right eye patterned retarder at the locations of the vertical viewing angle. Hence, as shown in FIG. 2, Japanese Laid Open Publication No. 2002-185983 discloses a method for obtaining wider vertical viewing angle by forming black stripes BS in an area of a patterned retarder corresponding to black matrixes BM of a display panel to thereby improve visibility of the 3D image. In FIG. 2, when the user observes the 3D image at a predetermined distance D, a vertical viewing angle $\alpha$, at which the crosstalk is not theoretically generated, depends on the size of the black matrixes BM of the display panel, the size of the black stripes BS of the patterned retarder, and a distance S between the display panel and the patterned retarder. The vertical viewing angle $\alpha$ widens as the size of the black matrixes BM and the size of the black stripes BS increase and the distance S between the display panel and the patterned retarder decreases.

However, the related art image display device including the black stripes has the following problems.

First, the black stripes of the patterned retarder, which are used to obtain the wide vertical viewing angle and improve the visibility of the 3D image, interact with the black matrixes of the display panel, thereby generating moiré. When a 2D image is implemented, the black stripes of the patterned retarder greatly reduce the visibility of the 2D image. FIG. 3 illustrates the moiré generated when observing, for example, a 47-inch image display device including black stripes at a location 4 meters away from the 47-inch image display device. As shown in FIG. 3, when the 2D image was implemented, moirés of 90 mm, 150 mm, and 355 mm were visible at observation locations A, B, and C, respectively.

Second, the black stripes of the patterned retarder, which are used to obtain the wide vertical viewing angle and improve the visibility of the 3D image, bring about a side effect resulting in a large reduction in a luminance of the 2D image. The side effect is generated because predetermined portions of pixels of the display panel are covered by a pattern of the black stripes as shown in FIG. 4(*b*). Accordingly, when the 2D image is implemented, an amount of transmitted light is reduced by about 30%, as compared to an image display device not including the black stripes as shown in FIG. 4(*a*).

SUMMARY OF THE INVENTION

Embodiments of the invention provide an image display device and a method of driving the same capable of improving visibility of both a 2D image and a 3D image and preventing a reduction in a luminance of the 2D image when implementing the 2D image.

In one aspect, there is An image display device comprising a display panel including a plurality of subpixel to selectively configure 2D image and 3D image, and a patterned retarder 11 separating the light incident from the display panel into a first polarization component and a second polarization component, wherein, the subpixel includes main subpixel, subsidiary subpixel and a control TFT for controlling a display gray level of the subsidiary subpixel, the main subpixel comprising a first liquid crystal cell, a first switch TFT switching on or off a current path between a data line and the first liquid crystal cell in response to a kth scan pulse which is supplied by a kth gate line, and a first storage capacitor formed by an overlap between a first common line, to which a first common voltage is applied, and a pixel electrode of the first liquid crystal cell, the subsidiary subpixel comprising a second liquid crystal cell, a second switch TFT switching on or off a current path between the data line and the second liquid crystal cell in response to the kth scan pulse, and a second storage capacitor formed by an overlap between a second common line, to which a second common voltage is applied, and a pixel electrode of the second liquid crystal cell, the control TFT switching on or off a current path between the second common line and the second storage capacitor in response to a (k+1)th scan pulse which is supplied by a (k+1)th gate line, so as to control display gray level of the subsidiary subpixel, when configuring the 2D image, the first and second common voltage are applied with the same DC voltage level, and when configuring the 3D image, the first common voltage is applied with the DC voltage level, and the second common voltage is applied with a different voltage level from the first voltage.

The second common voltage swings between predetermined voltage levels with reference to the first common voltage in configuring 3D image.

When configuring the 2D image, the main subpixel and subsidiary subpixel continuously display the same 2D image in response to the Kth scan pulse, when configuring the 3D image, the main subpixel continuously displays the 3D image in response to the Kth scan pulse and the subsidiary subpixel displays the 3D image in response to the Kth scan pulse and a black gray level in response to the (K+1)th scan pulse, under control of the control TFT.

The gate electrodes of the first and second switch TFT are connected to the kth gate line, and the gate electrode of the control TFT is connected to the (k+1)th gate line.

When configuring the 3D image, the second storage capacitor boosts the voltage level of the pixel electrode of the second liquid crystal cell with the (k+1)th gate line being activated.

The display panel includes an upper substrate being formed a common electrode, to which the first common voltage is applied, and a lower substrate, and the first and second common lines are formed on the lower substrate.

The image display device further including a holding capacitor, connected between the drain electrode of the control TFT and the common electrode, which uniformly holds the second common voltage on the second common line.

The common electrode forms a vertical electric field along with the pixel electrodes of the first and second liquid crystal cells.

The first and second liquid crystal cells are driven in a normally white mode.

The control TFT and the holding capacitor are formed in a non-display area where no image is displayed.

A ratio of the vertical height of the subsidiary subpixel to a vertical height of the main subpixel is 1:2.

In another aspect, there is a method of driving an image display device, in which a subpixel including main subpixel and subsidiary subpixel and a control TFT for controlling display gray level of the subsidiary subpixel are included, and the main subpixel including a first liquid crystal cell, the subsidiary subpixel including a second liquid crystal cell, comprising when configuring a 2D image, applying a first and second common voltage with the same DC voltage level, the first common voltage being applied to a common electrode, and the second common voltage being applied to one terminal of a storage capacitor of the subsidiary subpixel via the control TFT, switching on the switch TFTs of both the main subpixel and subsidiary subpixel in response to a Kth scan pulse which is supplied by a kth gate line, so as to allow a 2D image to be displayed on both the main subpixel and subsidiary subpixel, and switching off the switch TFTs of both the main subpixel and subsidiary subpixel and switching on the control TFT in response to a (k+1)th scan pulse which is supplied by a (k+1)th gate line, so as to allow a 2D image to be continuously displayed on both the main subpixel and subsidiary subpixel, when configuring a 3D image, applying the first and second common voltage, the first common voltage being applied to the common electrode, and the second common voltage being applied to one terminal of a storage capacitor of the subsidiary subpixel via the control TFT, wherein the first common voltage is a DC voltage level, and the second common voltage is a different voltage level from the first voltage, switching on the switch TFTs of both the main subpixel and subsidiary subpixel in response to the Kth scan pulse, so as to allow a 3D image to be displayed on both the main subpixel and subsidiary subpixel, and switching off the switch TFTs of both the main subpixel and subsidiary subpixel and switching on the control TFT in response to the (k+1)th scan pulse, so as to allow a 3D image to be continuously displayed on the main subpixel, and allow a black image to be displayed on the subsidiary subpixel.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail embodiments of the invention examples of which are illustrated in the accompanying drawings.

Figure 1:
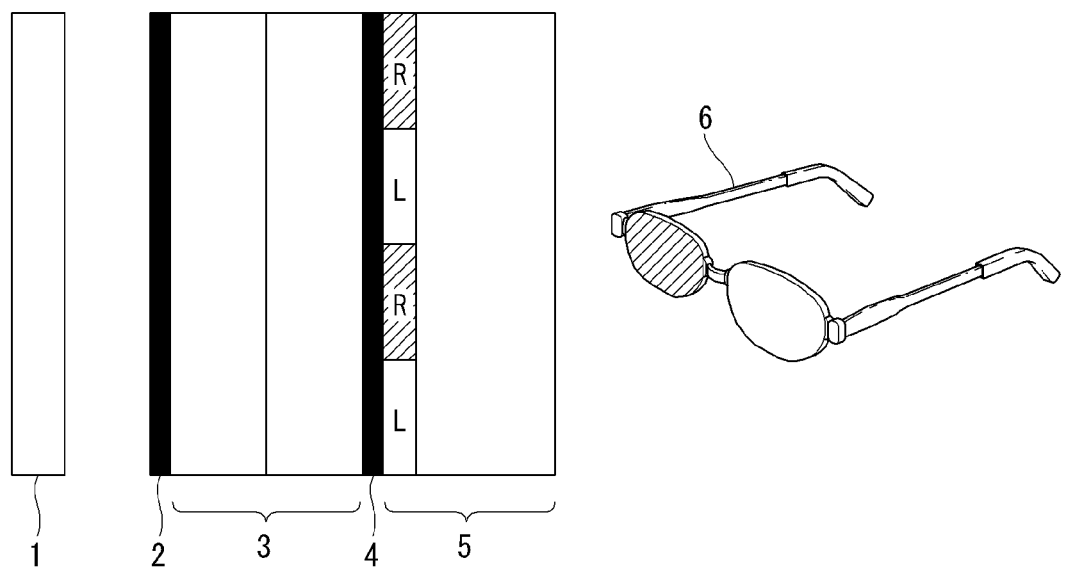
FIG. 1 schematically illustrates a related art glasses type image display device.
Figure 2:
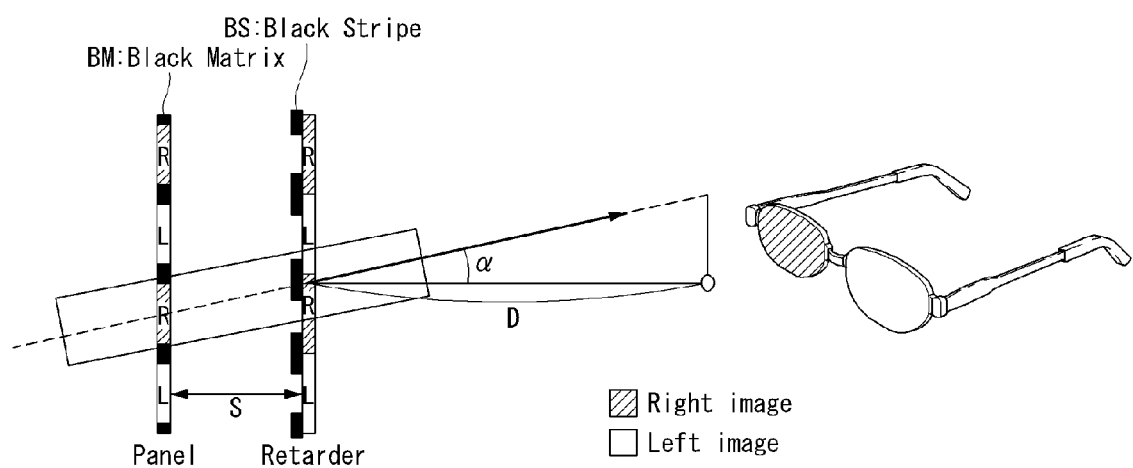
FIG. 2 illustrates a related art image display device having black stripes.
Figure 3:
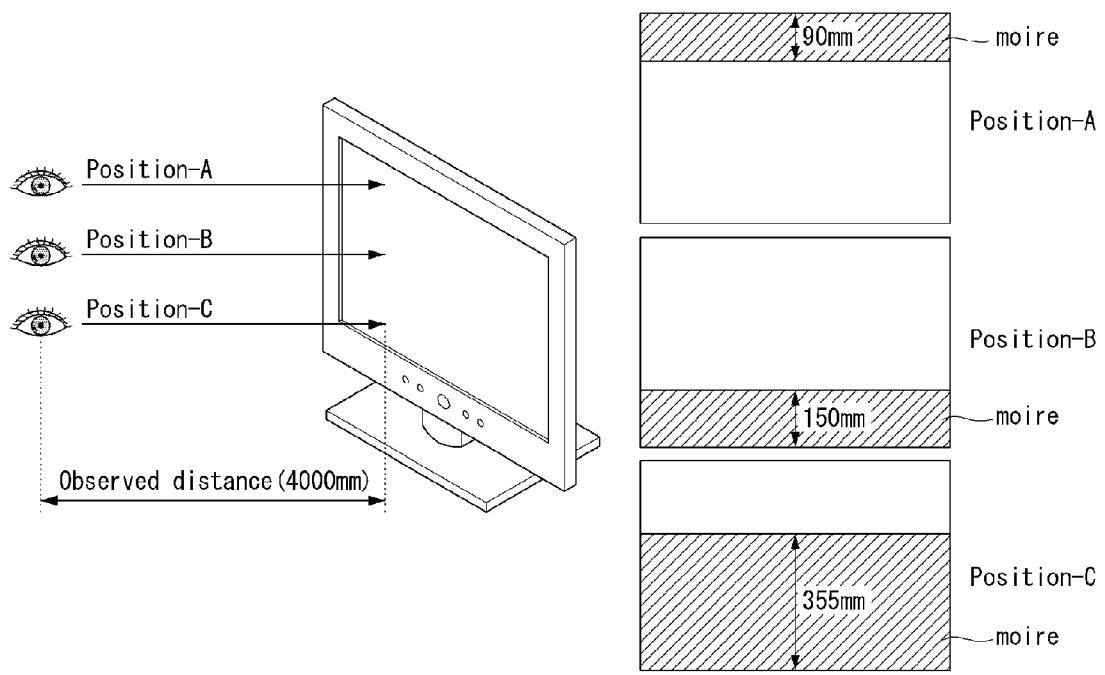
FIG. 3 illustrates moiré generated by black stripes of a related art image display device.
Figure 4:
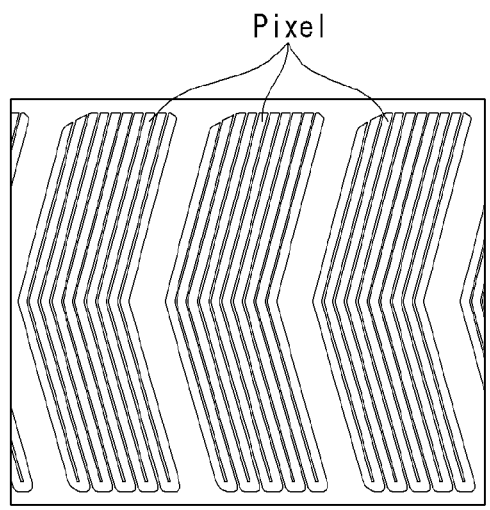
FIG. 4 illustrates an example where an amount of transmitted light is reduced by black stripes of a related art image display device.
Figure 4:
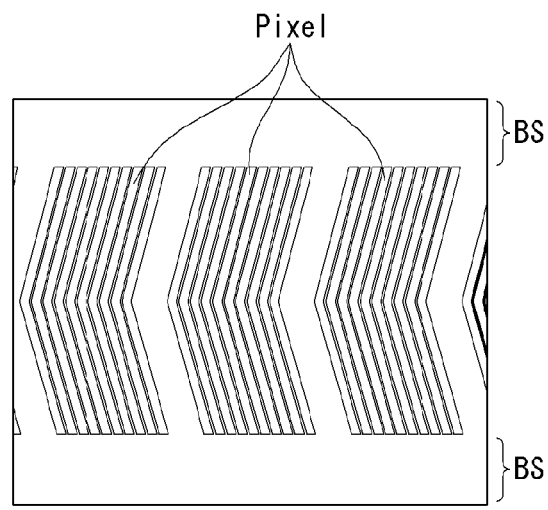
Figure 5:
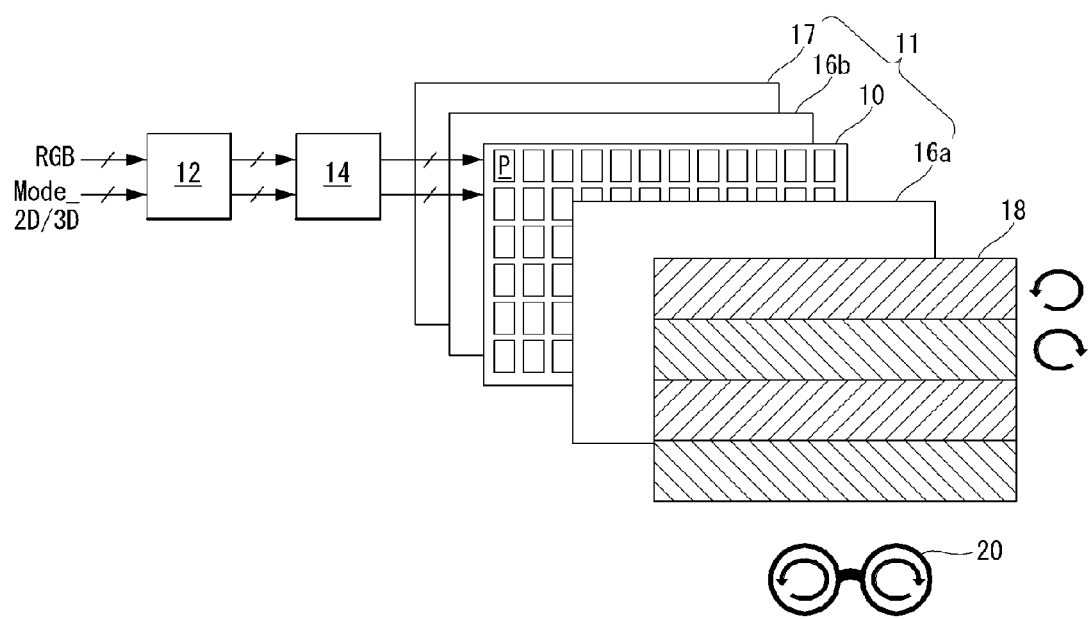
FIGS. 5 and 6 are block diagrams of an image display device according to an example embodiment of the invention.
Figure 6:
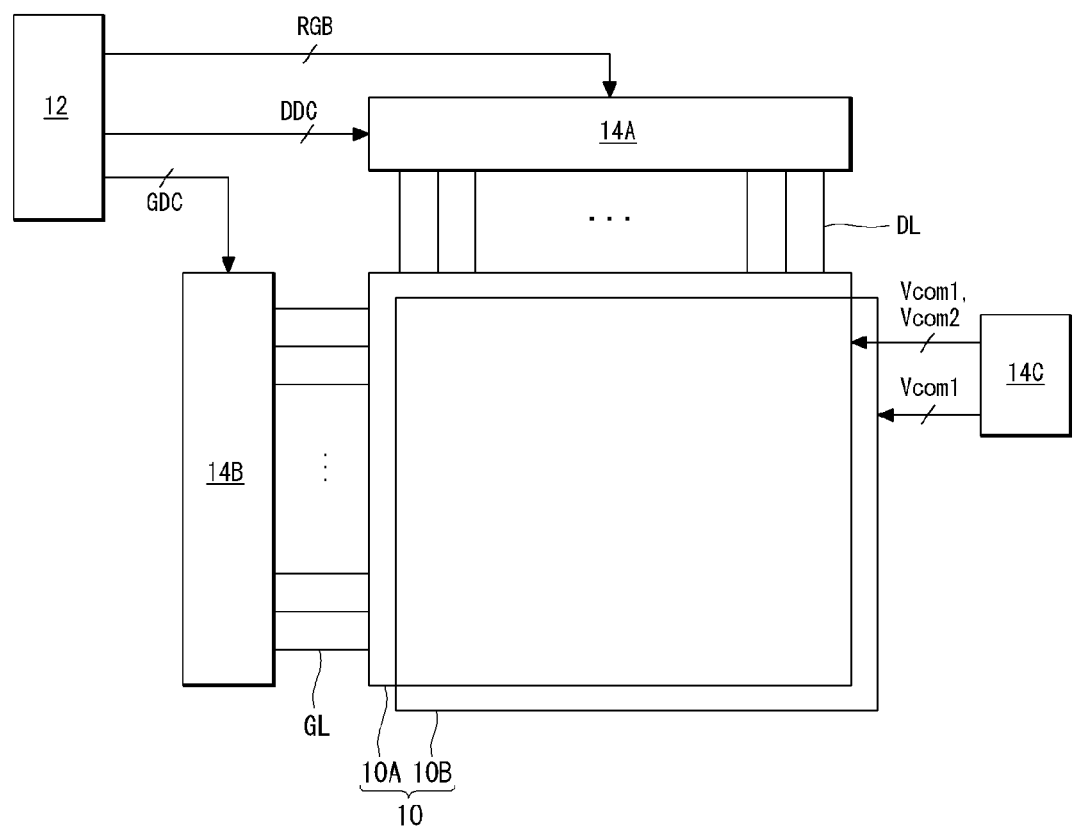
Figure 7:
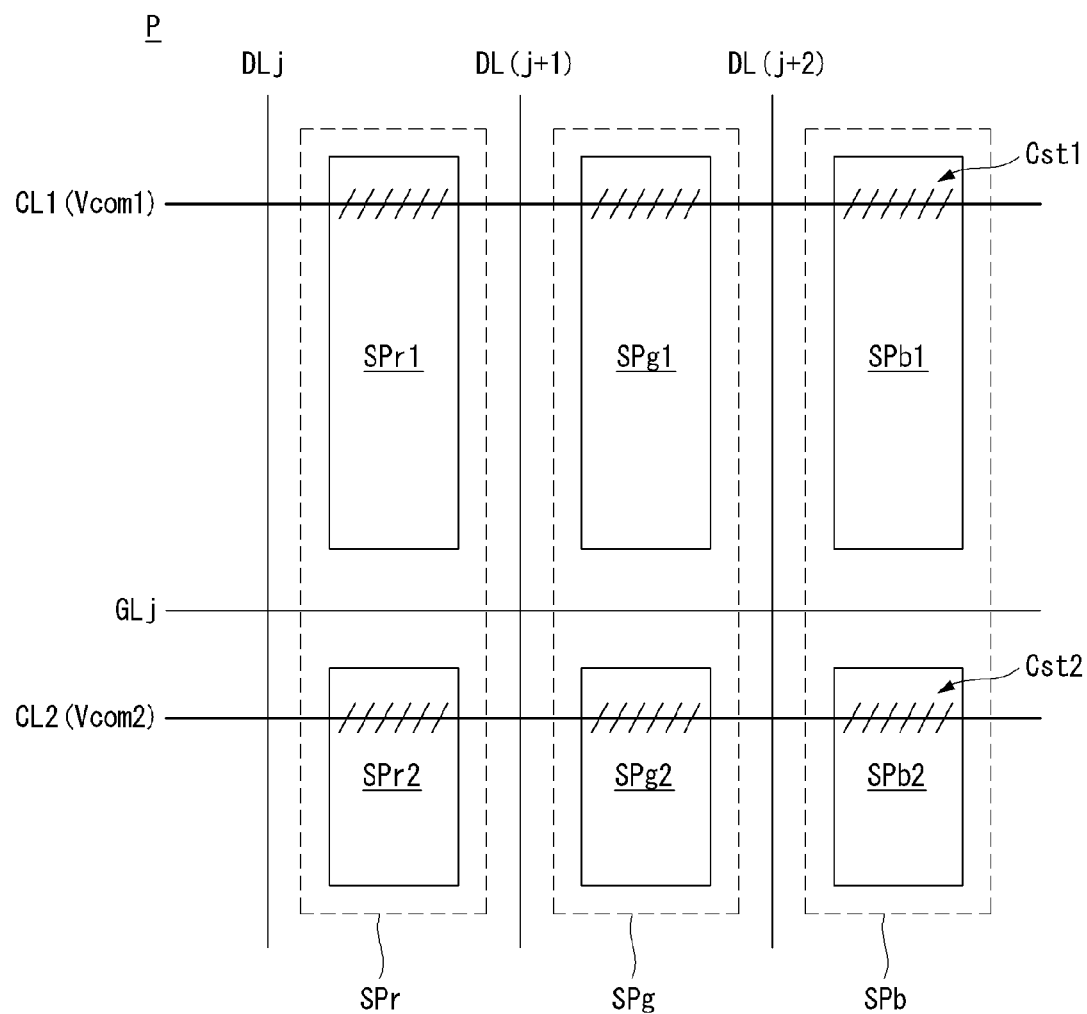
FIG. 7 illustrates a structure of a unit pixel.
Figure 8A:
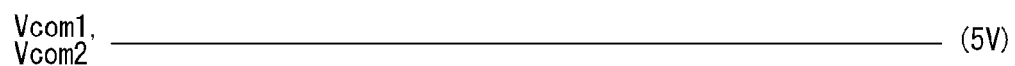
FIG. 8A illustrates generation levels of a first common voltage and a second common voltage in a 2D mode.
Figure 8B:
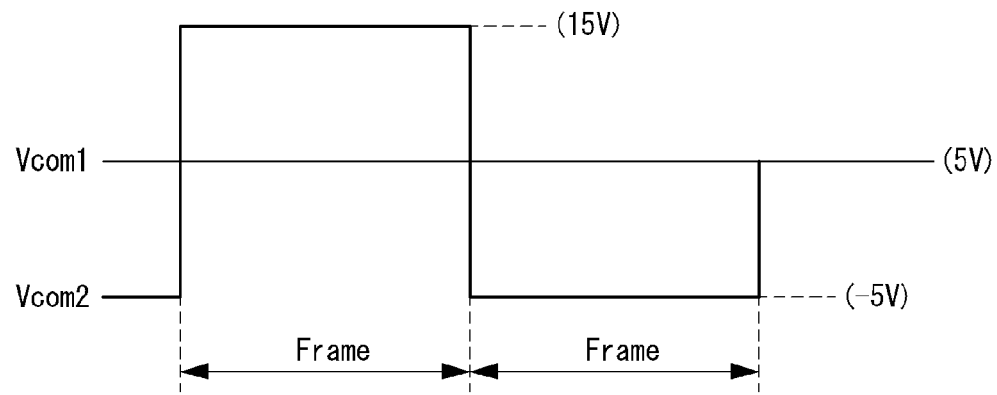
FIG. 8B illustrates generation levels of a first common voltage and a second common voltage in a 3D mode.

FIGS. 5 and 6 are block diagrams of an image display device according to an example embodiment of the invention. FIG. 7 illustrates a structure of a unit pixel of the image display device. FIG. 8A illustrates generation levels of a first common voltage and a second common voltage in a 2D mode. FIG. 8B illustrates generation levels of a first common voltage and a second common voltage in a 3D mode.

As shown in FIGS. 5 and 6, an image display device according to an example embodiment of the invention includes a display element 11, a controller 12, a panel driving circuit 14, a patterned retarder 18, and polarization glasses 20. The patterned retarder 18 and the polarization glasses 20 serve as a 3D driving element and thus spatially separate a left eye image and a right eye image, thereby implementing a binocular disparity.

The display element 11 may be implemented as a liquid crystal display element. The liquid crystal display element includes a display panel 10, an upper polarizing film 16a positioned between the display panel 10 and the patterned retarder 18, and a lower polarizing film 16b positioned in the rear of the display panel 10.

The display panel 10 includes a lower glass substrate 10A, an upper glass substrate 10B, and a liquid crystal layer interposed between the lower glass substrate 10A and the upper glass substrate 10B. A thin film transistor (TFT) array is formed on the lower glass substrate 10A. The TFT array includes a plurality of data lines DL to which R (red), G (green), and B (blue) data voltages are supplied, a plurality of gate lines GL (or scan lines) that cross the data lines DL and receive a gate pulse (or scan pulse), a plurality of TFTs formed at crossings of the data lines DL and the gate lines GL, a plurality of pixel electrodes of liquid crystal cells for charging the liquid crystal cells to the data voltage, a plurality of storage capacitors that are respectively connected to the pixel electrodes and uniformly hold a voltage of the liquid crystal cells, and the like. A color filter array is formed on the upper glass substrate 10B. The color filter array includes black matrixes, color filters, and the like. The liquid crystal cells are driven in a normally white mode in which a transmittance or a gray level decreases as a voltage level difference between the data voltage and a common voltage increases. The upper polarizing film 16a is attached to the upper glass substrate 10B, and the lower polarizing film 16b is attached to the lower glass substrate 10A. Alignment layers for setting pre-tilt angles of liquid crystals are respectively formed inside the upper and lower glass substrates 10A and 10B contacting the liquid crystals. A column spacer may be formed between the upper and lower glass substrates 10A and 10B to keep cell gaps of the liquid crystal cells constant.

In the embodiment of the invention, because the liquid crystal cells are driven in a vertical electric field driving manner, a common electrode, to which the common voltage is applied, is positioned on the upper glass substrate 10B to be opposite to the pixel electrode and forms a vertical electric field along with the pixel electrode.

As shown in FIG. 7, a unit pixel P formed on the display panel 10 includes an R (red) subpixel SPr, a G (green) subpixel SPg, and a B (blue) subpixel SPb. The R subpixel SPr includes an R main subpixel SPr1 and an R subsidiary subpixel SPr2 that are positioned on opposite sides of a gate line GLj. When the gate line GLj is activated, the R main subpixel SPr1 and the R subsidiary subpixel SPr2 are electrically connected to a first data line DLj. The G subpixel SPg includes a G main subpixel SPg1 and a G subsidiary subpixel SPg2 that are positioned on opposite sides of the gate line GLj. When the gate line GLj is activated, the G main subpixel SPg1 and the G subsidiary subpixel SPg2 are electrically connected to a second data line DL(j+1). The B subpixel SPb includes a B main subpixel SPb1 and a B subsidiary subpixel SPb2 that are positioned on opposite sides of the gate line GLj. When the gate line GLj is activated, the B main subpixel SPb1 and the B subsidiary subpixel SPb2 are electrically connected to a third data line DL(j+2).

The unit pixel P forms a storage capacitor in a storage-on-common manner. Each of the R, G, and B main subpixels SPr1, SPg1, and SPb1 includes a first storage capacitor Cst1, and each of the R, G, and B subsidiary subpixels SPr2, SPg2, and SPb2 includes a second storage capacitor Cst2. A first common line CL1 is disposed on the main subpixels SPr1, SPg1, and SPb1 and overlaps the pixel electrode of each of the main subpixels SPr1, SPg1, and SPb1, thereby forming the first storage capacitor Cst1 of each of the main subpixels SPr1, SPg1, and SPb1. A second common line CL2 is disposed on the subsidiary subpixels SPr2, SPg2, and SPb2 and overlaps the pixel electrode of each of the subsidiary subpixels SPr2, SPg2, and SPb2, thereby forming the second storage capacitor Cst2 of each of the subsidiary subpixels SPr2, SPg2, and SPb2.

A connection structure and an operation effect of the R, G and B subpixels are described in detail below with reference to FIGS. 9 to 14. The liquid crystal display element according to the example embodiment of the invention may be implemented as any type liquid crystal display including a backlight liquid crystal display, a transflective liquid crystal display, and a reflective liquid crystal display. A backlight unit 17 is necessary in the backlight liquid crystal display and the transflective liquid crystal display. The backlight unit 17 may be implemented as one of a direct type backlight unit and an edge type backlight unit.

The panel driving circuit 14 includes a data driver 14A for driving the data lines DL of the display panel 10, a gate driver 14B for driving the gate lines GL of the display panel 10, and a common voltage supply unit 14C for supplying the common voltage to the display panel 10.

The data driver 14A includes a plurality of source driver integrated circuits (ICs). Each source driver IC includes a shift register, a latch, a digital-to-analog converter (DAC), an output buffer, and the like. The data driver 14A converts RGB digital video data of 2D and 3D data formats into an analog gamma voltage under the control of the controller 12 and generates the R, G, and B data voltages. The data driver 14A then supplies the R, G, and B data voltages to the data lines DL.

The gate driver 14B includes a shift register, a multiplexer array, a level shifter, and the like. The gate driver 14B generates the scan pulse under the control of the controller 12 and sequentially activates the gate lines GL using the scan pulse.

The common voltage supply unit 14C generates a first common voltage Vcom1 under the control of the controller 12 and supplies the first common voltage Vcom1 to the common electrodes of the upper glass substrate 10B and the first common lines CL1 of the lower glass substrate 10A. Further, the common voltage supply unit 14C generates a second common voltage Vcom2 under the control of the controller 12 and supplies the second common voltage Vcom2 to the second common lines CL2 of the lower glass substrate 10A. As shown in FIG. 8A, in a 2D mode Mode_2D, the second common voltage Vcom2 generated by the common voltage supply unit 14C has the same direct current (DC) voltage level (for example, about 5V) as the first common voltage Vcom1. As shown in FIG. 8B, in a 3D mode Mode_3D, the second common voltage Vcom2 generated by the common voltage supply unit 14C has a different voltage level from the first voltage. In other words, in a 3D mode Mode_3D, the second common voltage Vcom2 generated by the common voltage supply unit 14C has an alternating current (AC) voltage level, that swings between predetermined voltage levels (for example, between −5V and 15V) with reference to the first common voltage Vcom1 every predetermined period (i.e., in units of one frame period).

The controller 12 controls the panel driving circuit 14 in the 2D mode Mode_2D or the 3D mode Mode_3D in response to a mode selection signal input through a user interface (not shown) or a 2D/3D identification code extracted from an input image signal.

In the 3D mode Mode_3D, the controller 12 separates the RGB digital video data of 3D data format received from a system board (not shown) into left eye RGB data (hereinafter, referred to as "left eye image data") of 3D data format and right eye RGB data (hereinafter, referred to as "right eye image data") of 3D data format in conformity with a resolution of the display panel 10. The controller 12 then alternately supplies the left eye image data corresponding to one horizontal line and the right eye image data corresponding to one horizontal line to the data driver 14A. In the 2D mode Mode_2D, the controller 12 arranges the RGB digital video data of 2D data format received from a video source in conformity with the resolution of the display panel 10 and supplies the arranged RGB digital video data of 2D data format to the data driver 14A.

The controller 12 generates timing control signals for controlling an operation timing of the panel driving circuit 14 using timing signals such as a vertical sync signal, a horizontal sync signal, a dot clock, and a data enable received from the system board. The controller 12 may multiply the frequency of the timing control signals by N and may control an operation of the panel driving circuit 14 at a frame frequency of (N×f) Hz, where N is a positive integer equal to or greater than 2, and f is an input frame frequency.

The patterned retarder 18 may be patterned on one of a glass substrate, a transparent plastic substrate, and a film. The substrate, etc. with the patterned retarder 18 formed thereon is attached to the upper polarizing film 16a using an adhesive. The patterned retarder 18 includes first and second retarders, whose light absorption axis are perpendicular to each other, and divides the 3D image into polarization components. The first retarder is formed on odd-numbered lines of the patterned retarder 18 and transmits a first polarization (for example, circular polarization or linear polarization) component of light incident through the upper polarizing film 16a. The second retarder is formed on even-numbered lines of the patterned retarder 18 and transmits a second polarization (for example, circular polarization or linear polarization) component of light incident through the upper polarizing film 16a. For example, the first retarder may be implemented as a polarization filter transmitting left circularly polarized light, and the second retarder may be implemented as a polarization filter transmitting right circularly polarized light.

The polarization glasses 20 are implemented so that its light absorption axis varies depending on the polarization components emitted from the patterned retarder 18. For example, a left eyeglass of the polarization glasses 20 transmits the left circularly polarized light transmitted by the first retarder of the patterned retarder 18 and blocks light of other polarization components. Further, a right eyeglass of the polarization glasses 20 transmits the right circularly polarized light transmitted by the second retarder of the patterned retarder 18 and blocks light of other polarization components. In this instance, the left eyeglass of the polarization glasses 20 may include a left circular polarization filter, and the right eyeglass of the polarization glasses 20 may include a right circular polarization filter.

FIGS. 9 to 14 illustrate a connection structure and an operation effect of a subpixel. The connection structure and the operation effect of the subpixel illustrated in FIGS. 9 to 14 are applied to each of the R subpixel, the G subpixel, and the B subpixel.

Figure 9:
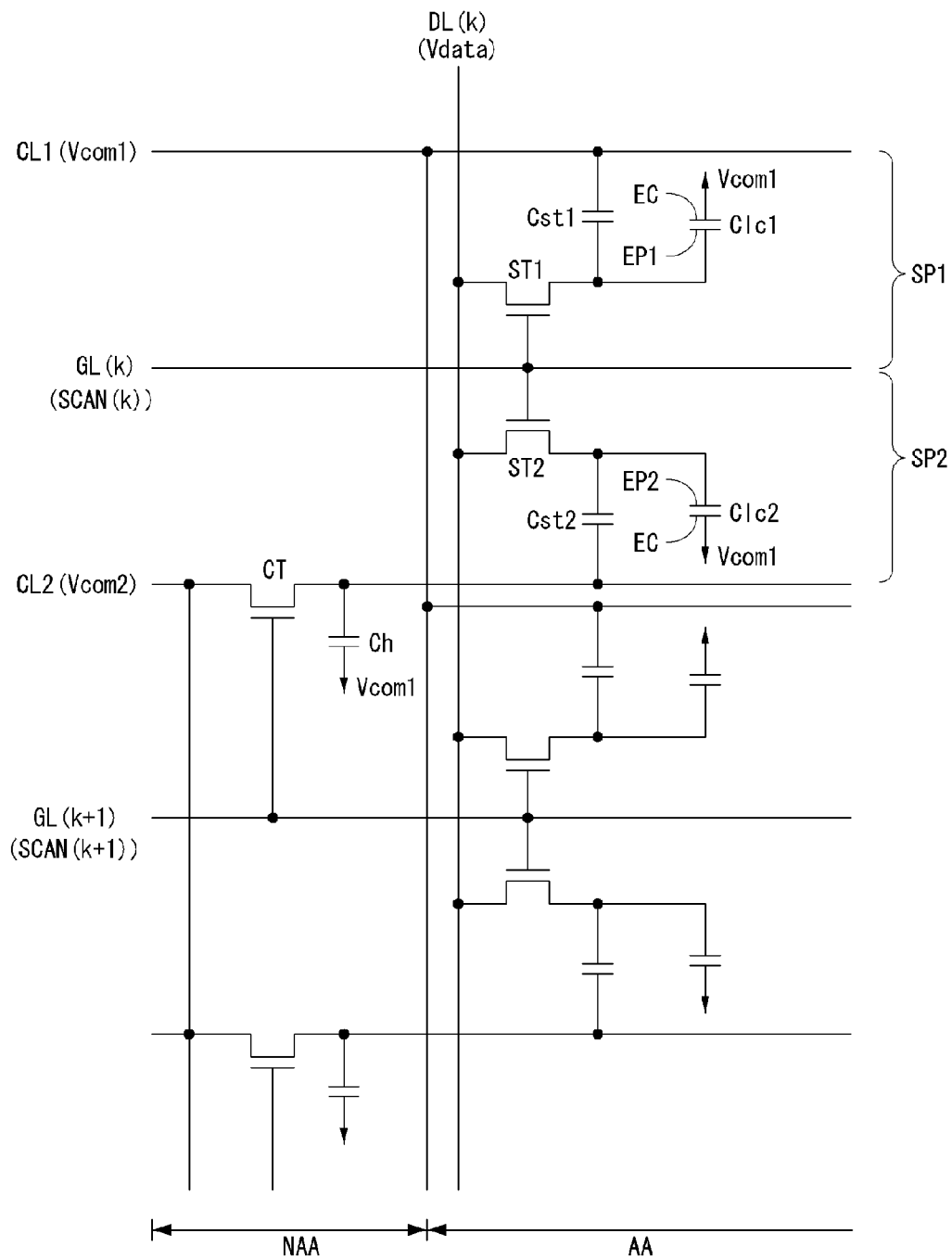
FIG. 9 illustrates a connection configuration of a subpixel.

FIG. 9 illustrates a connection configuration of a subpixel.

As shown in FIG. 9, a subpixel SP includes a main subpixel SP1 and a subsidiary subpixel SP2, that are positioned on opposite sides of a kth gate line GLk, where k is a positive integer, and a control TFT CT for controlling a display gray level of the subsidiary subpixel SP2.

The main subpixel SP1 includes a first liquid crystal cell Clc1, a first switch TFT ST1, and a first storage capacitor Cst1.

The first liquid crystal cell Clc1 includes a first pixel electrode EP1 and a common electrode EC, that are positioned opposite each other with the liquid crystal layer interposed therebetween. The first switch TFT ST1 switches on or off a current path between a kth data line DLk and the first pixel electrode EP1 in response to a kth scan pulse SCAN(k). For this, a gate electrode of the first switch TFT ST1 is connected to the kth gate line GLk, a source electrode of the first switch TFT ST1 is connected to the kth data line DLk, and a drain electrode of the first switch TFT ST1 is connected to the first pixel electrode EP1. The first common voltage Vcom1 is applied to the common electrode EC. The first storage capacitor Cst1 is formed by an overlap between the first common line CL1, to which the first common voltage Vcom1 is applied, and the first pixel electrode EP1, to which the data voltage Vdata is applied. The first storage capacitor Cst1 uniformly holds the data voltage Vdata charged to the first pixel electrode EP1 during one frame period.

The subsidiary subpixel SP2 includes a second liquid crystal cell Clc2, a second switch TFT ST2, and a second storage capacitor Cst2.

The second liquid crystal cell Clc2 includes a second pixel electrode EP2 and a common electrode EC, that are positioned opposite each other with the liquid crystal layer interposed therebetween. The second switch TFT ST2 switches on or off a current path between the kth data line DLk and the second pixel electrode EP2 in response to the kth scan pulse SCAN(k). For this, a gate electrode of the second switch TFT ST2 is connected to the kth gate line GLk, a source electrode of the second switch TFT ST2 is connected to the kth data line DLk, and a drain electrode of the second switch TFT ST2 is connected to the second pixel electrode EP2. The first common voltage Vcom1 is applied to the common electrode EC. The second storage capacitor Cst2 is formed by an overlap between the second common line CL2, to which the second common voltage Vcom2 is applied, and the second pixel electrode EP2, to which the data voltage Vdata is applied. The second storage capacitor Cst2 uniformly holds the data voltage Vdata charged to the second pixel electrode EP2 during one frame period, or boosts the data voltage Vdata charged to the second pixel electrode EP2 to implement a perceived gray level of the subsidiary subpixel SP2 as a black gray level, based on the level of the second common voltage Vcom2.

The control TFT CT switches on or off a current path between the second common line CL2, to which the second common voltage Vcom2 is applied, and the second storage capacitor Cst2 in response to a (k+1)th scan pulse SCAN(k+1). For this, a gate electrode of the control TFT CT is connected to a (k+1)th gate line GL(k+1), a source electrode of the control TFT CT is connected to the second common line CL2, and a drain electrode of the control TFT CT is connected to the second storage capacitor Cst2. A holding capacitor Ch is connected between the drain electrode of the control TFT CT and the common electrode EC of the second liquid crystal cell Clc2. The holding capacitor Ch uniformly holds the second common voltage Vcom2 on the second common line CL2.

The control TFT CT and the holding capacitor Ch may be formed in a non-display area NAA positioned outside a display area AA of the display panel 10.

Figure 10A:
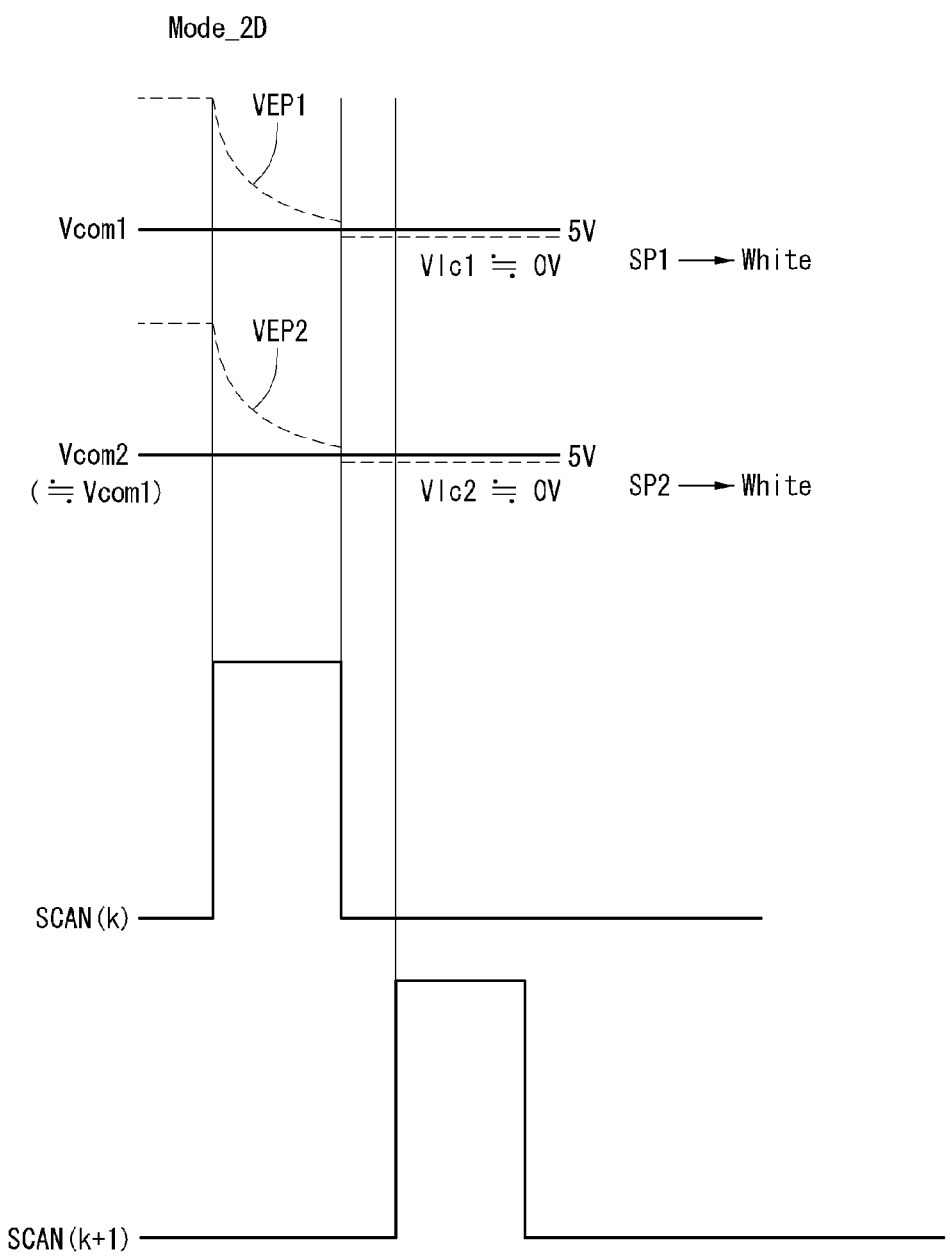
FIG. 10A illustrates a display state of a subpixel in a 2D mode.

FIG. 10A illustrates a display state of the subpixel SP in the 2D mode Mode_2D.

The operation and the effect of the subpixel SP in the 2D mode Mode_2D are described with reference to a signal waveform and a charging waveform illustrated in FIG. 10A along with the connection configuration illustrated in FIG. 9.

In the 2D mode Mode_2D, the first and second common voltages Vcom1 and Vcom2 having the same DC voltage level, for example, about 5V are input.

Figure 12:
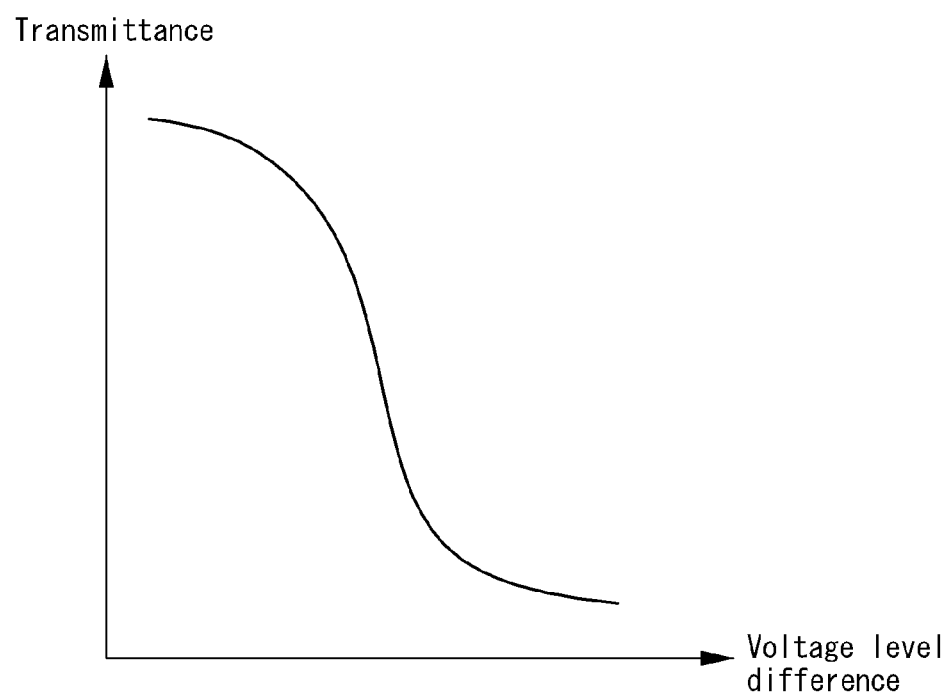
FIG. 12 is a graph illustrating a relationship between a transmittance and a voltage level difference in a normally white mode.

The first and second switch TFTs ST1 and ST2 are turned on during a period in which the kth scan pulse SCAN(k) is input. The kth data voltage Vdata is applied to the first pixel electrode EP1 of the main subpixel SP1 by the turn-on operation of the first switch TFT ST1. As a result, as shown in FIG. 12, the first liquid crystal cell Clc1 of the main subpixel SP1 has a transmittance, that is inversely proportional to a voltage level difference between the kth data voltage Vdata and the first common voltage Vcom1. For example, when the kth data voltage Vdata has the same voltage level (for example, about 5V) as the first common voltage Vcom1, the main subpixel SP1 displays a white gray level. Further, the kth data voltage Vdata is applied to the second pixel electrode EP2 of the subsidiary subpixel SP2 by the turn-on operation of the second switch TFT ST2. As a result, as shown in FIG. 12, the second liquid crystal cell Clc2 of the subsidiary subpixel SP2 has a transmittance, that is inversely proportional to the voltage level difference between the kth data voltage Vdata and the first common voltage Vcom1. For example, when the kth data voltage Vdata has the same voltage level (for example, about 5V) as the first common voltage Vcom1, the subsidiary subpixel SP2 displays the white gray level.

Subsequently, the first and second switch TFTs ST1 and ST2 are turned off and the control TFT CT is turned on during a period in which the (k+1)th scan pulse SCAN(k+1) is input. Although the first switch TFT ST1 is turned off, a voltage level difference of the first liquid crystal cell Clc1 is uniformly held by the first storage capacitor Cst1. When the second switch TFT ST2 is turned off, a voltage level difference of the second liquid crystal cell Clc2 depends on the second common voltage Vcom2, that is applied to one terminal of the second storage capacitor Cst2 through the control TFT CT. However, because the first and second common voltages Vcom1 and Vcom2 having the same DC voltage level are input in the 2D mode Mode_2D, the voltage level difference of the second liquid crystal cell Clc2 is uniformly held by the second storage capacitor Cst2. Thus, the subsidiary subpixel SP2 continuously displays the white gray level.

Figure 13A:
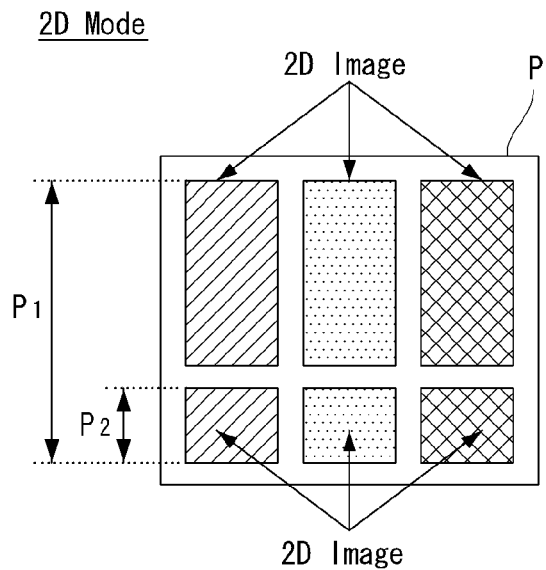
FIG. 13A illustrates an image displayed on the unit pixel in a 2D mode.

Consequently, as shown in FIG. 13A, the main subpixel SP1 and the subsidiary subpixel SP2 continuously display the white gray level, thereby displaying the same 2D image. The 2D image displayed on the subsidiary subpixel SP2 plays a role in increasing a luminance of the 2D image. Hence, the example embodiment of the invention can prevent the luminance reduction and moiré when the 2D image is implemented and thus can greatly improve the visibility of the 2D image.

The example embodiment of the invention describes the 2D image implemented at the white gray level as an example. Other gray levels may be used for the 2D image. The gray level of the 2D image may vary based on the magnitude of the data voltage Vdata. For example, when the data voltage Vdata has a predetermined voltage level between the first common voltage Vcom1 and the second common voltage Vcom2, the 2D image may be implemented at a middle gray level between the white gray level and the black gray level.

Figure 10B:
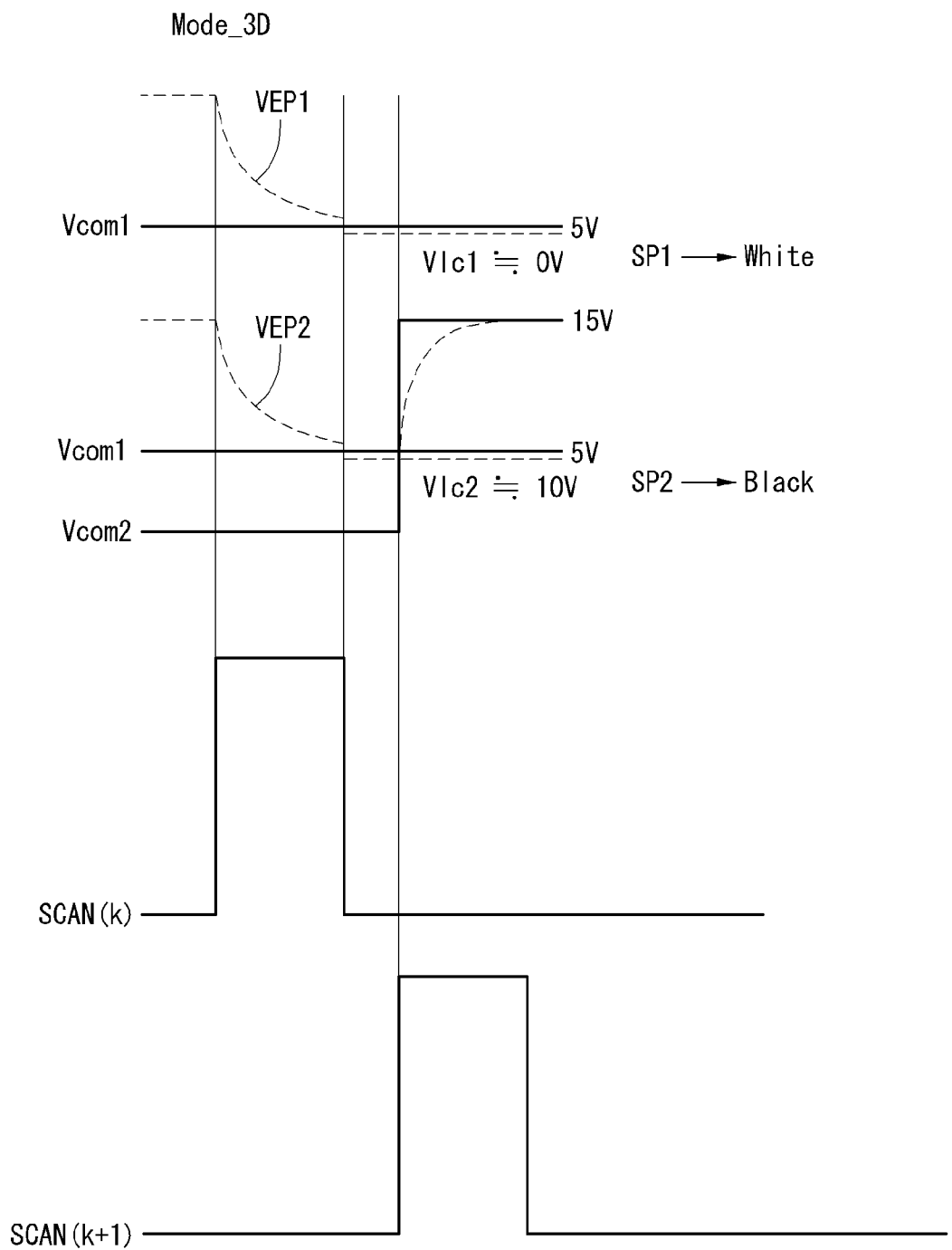
FIG. 10B illustrates a display state of a subpixel in a 3D mode.
Figure 11:
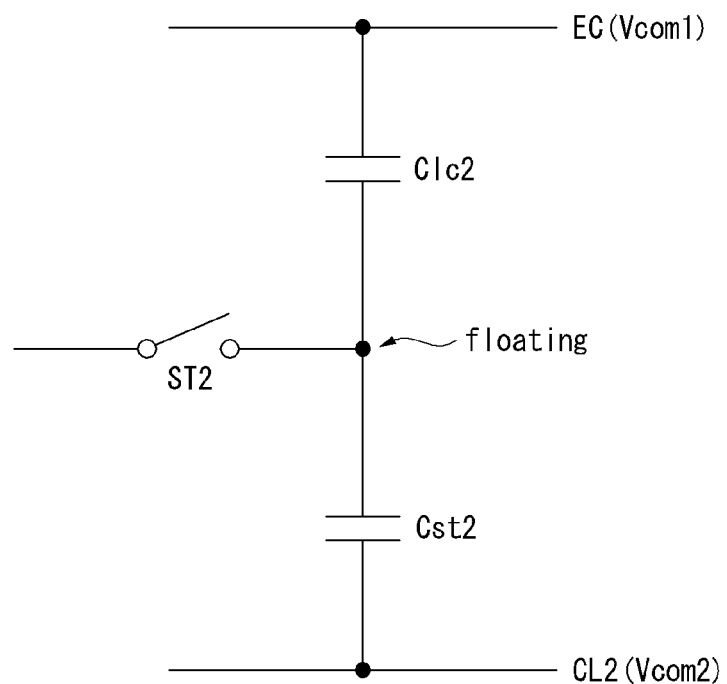
FIG. 11 is an equivalent circuit diagram of a subsidiary subpixel at a turn-off time point of a second switch TFT and a turn-on time point of a control TFT.

FIG. 10B illustrates a display state of the subpixel SP in the 3D mode Mode_3D. FIG. 11 is an equivalent circuit diagram of the subsidiary subpixel SP2 at a turn-off time point of the second switch TFT ST2 and a turn-on time point of the control TFT CT.

The operation and the effect of the subpixel SP in the 3D mode Mode_3D are described with reference to a signal waveform and a charging waveform illustrated in FIG. 10B along with the connection configuration illustrated in FIG. 9.

In the 3D mode Mode_3D, the first common voltage Vcom1 having the DC voltage level (for example, about 5V) is input, and the second common voltage Vcom2 having the AC voltage level, that swings between predetermined voltage levels (for example, between −5V and 15V) every one frame period, is input. A reason why the second common voltage Vcom2 swings in the embodiment of the invention is to remove DC image sticking from the subsidiary subpixel SP2 by preventing the degradation of the liquid crystals. In the following description, it is assumed that the second common voltage Vcom2 of 15V is input in a predetermined frame period.

The first and second switch TFTs ST1 and ST2 are turned on during the period in which the kth scan pulse SCAN(k) is input. The kth data voltage Vdata is applied to the first pixel electrode EP1 of the main subpixel SP1 by the turn-on operation of the first switch TFT ST1. As a result, as shown in FIG. 12, the first liquid crystal cell Clc1 of the main subpixel SP1 has a transmittance, that is inversely proportional to the voltage level difference between the kth data voltage Vdata and the first common voltage Vcom1. For example, when the kth data voltage Vdata has the same voltage level (for example, about 5V) as the first common voltage Vcom1, the main subpixel SP1 displays the white gray level. Further, the kth data voltage Vdata is applied to the second pixel electrode EP2 of the subsidiary subpixel SP2 by the turn-on operation of the second switch TFT ST2. As a result, as shown in FIG. 12, the second liquid crystal cell Clc2 of the subsidiary subpixel SP2 has a transmittance, that is inversely proportional to the voltage level difference between the kth data voltage Vdata and the first common voltage Vcom1. For example, when the kth data voltage Vdata has the same voltage level (for example, about 5V) as the first common voltage Vcom1, the subsidiary subpixel SP2 displays the white gray level.

Subsequently, the first and second switch TFTs ST1 and ST2 are turned off and the control TFT CT is turned on during the period in which the (k+1)th scan pulse SCAN(k+1) is input. Although the first switch TFT ST1 is turned off, the voltage level difference of the first liquid crystal cell Clc1 is uniformly held by the first storage capacitor Cst1. When the second switch TFT ST2 is turned off, the voltage level difference of the second liquid crystal cell Clc2 depends on the second common voltage Vcom2, that is applied to one terminal of the second storage capacitor Cst2 through the control TFT CT. Because the second common voltage Vcom2 having a voltage level (for example, about 15V in FIG. 10B) different from the first common voltage Vcom1 is input in the 3D mode Mode_3D, a voltage of a floating node of the second liquid crystal cell Clc2 increases from about 5V to 15V by a boosting effect resulting from the second storage capacitor Cst2 as shown in FIG. 11. Hence, the subsidiary subpixel SP2 displays a black gray level based on the inverse proportion relation between the voltage level difference and the transmittance illustrated in FIG. 12 by the voltage level difference of the second liquid crystal cell Clc2, that increases from about 0V to 10V.

Figure 13B:
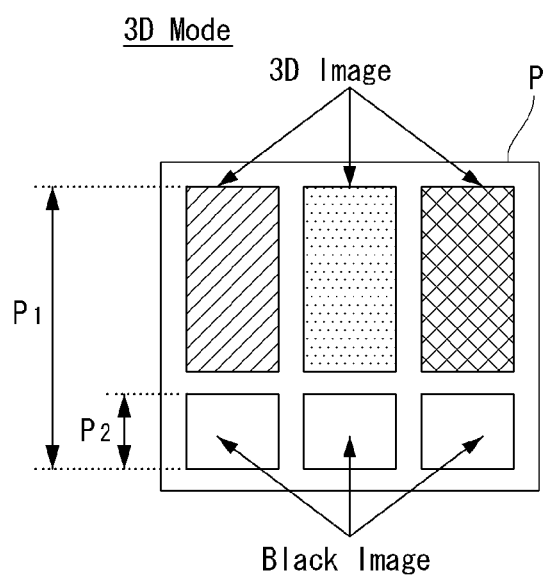
FIG. 13B illustrates an image displayed on the unit pixel in a 3D mode.

Consequently, as shown in FIG. 13B, the main subpixel SP1 continuously displays the white gray level to display the 3D image, and the subsidiary subpixel SP2 displays the black gray level after a predetermined period (for example, one horizontal period) passed from a charging time point to display a black image. In the 3D mode Mode_3D, the black image plays a role in increasing a display interval between the 3D images adjacent to each other in a vertical direction. Hence, the example embodiment of the invention can widely secure 3D vertical viewing angle through the black image without a separate black stripe pattern and thus can greatly improve the visibility of the 3D image as compared to the related art.

The example embodiment of the invention describes the 3D image implemented at the white gray level as an example. Other gray levels may be used for the 3D image. The gray level of the 3D image may vary based on the magnitude of the data voltage Vdata. For example, when the data voltage Vdata has a predetermined voltage level between the first common voltage Vcom1 and the second common voltage Vcom2, the 3D image may be implemented at a middle gray level between the white gray level and the black gray level.

Figure 14:
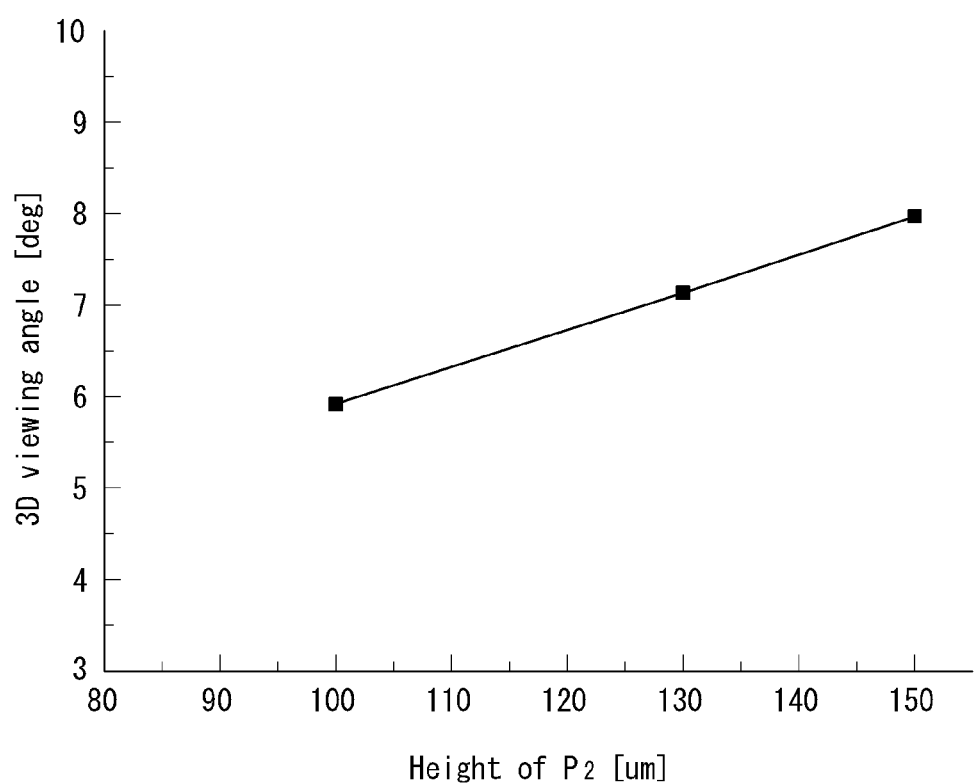
FIG. 14 is a graph illustrating a relationship between a vertical pitch of a subsidiary subpixel and a 3D viewing angle.

As shown in FIG. 14, a vertical pitch P2 of the subsidiary subpixel SP2 is closely related to the 3D vertical viewing angle. More specifically, the 3D vertical viewing angle increases as a percentage (P2*100)/P1 of the vertical pitch P2 of the subsidiary subpixel SP2 based on a vertical pitch P1 of the subpixel SP increases, and decreases as the percentage (P2*100)/P1 decreases. On the other hand, the luminance of the 3D image decreases as the percentage (P2*100)/P1 increases, and increases as the percentage (P2*100)/P1 decreases. According to an experiment, when a ratio of the vertical pitch P2 of the subsidiary subpixel SP2 to a vertical pitch of the main subpixel SP1 was 1:2, the 3D vertical viewing angle and the luminance of the 3D image approached a satisfactory level. However, because the ratio may vary depending on demand specifications of 3D characteristics, the vertical pitch P2 of the subsidiary subpixel SP2 may be selected to a suitable size in consideration of a relationship between the 3D vertical viewing angle and the luminance of the 3D image.

Figure 15:
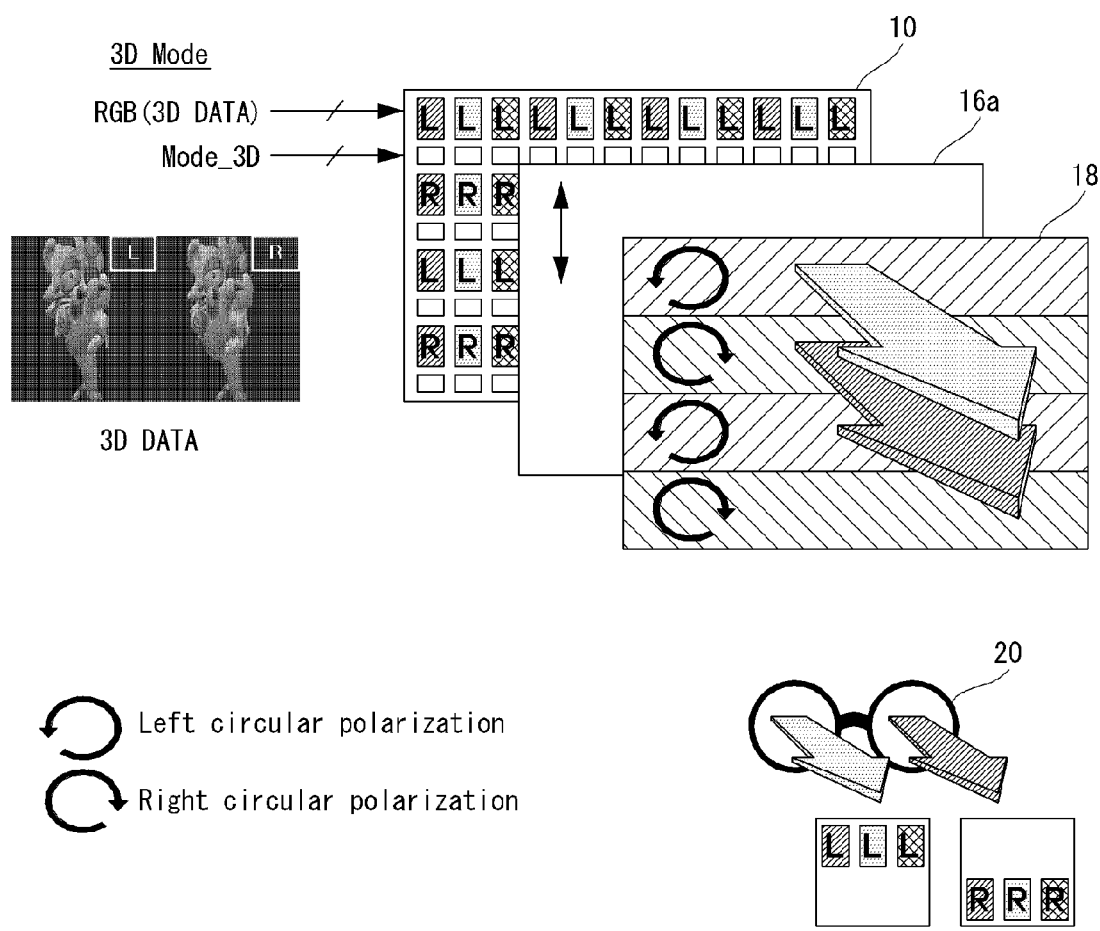
FIG. 15 schematically illustrates an operation of the image display device in a 3D mode.

FIG. 15 schematically illustrates an operation of the image display device in the 3D mode Mode_3D.

As shown in FIG. 15, in the 3D mode Mode_3D, a left eye RGB image L is displayed on the main subpixels positioned on odd-numbered horizontal lines of the display panel 10, and a right eye RGB image R is displayed on the main subpixels positioned on even-numbered horizontal lines of the display panel 10. The left eye RGB image L and the right eye RGB image R are divided into polarization components by the first and second retarders, that are alternatively formed on horizontal lines of the patterned retarder 18. The left eye RGB image L transmitted by the first retarder is transmitted into the left eyeglass of the polarization glasses 20, and the right eye RGB image R transmitted by the second retarder is transmitted into the right eyeglass of the polarization glasses 20. Hence, the 3D image is implemented.

In the 3D mode Mode_3D, the black image is displayed on each of the subsidiary subpixels of the display panel 10. The black image plays a role in increasing a display interval between the left eye RGB image L and the right eye RGB image R, that are disposed adjacent to each other in a vertical direction.

Figure 16:
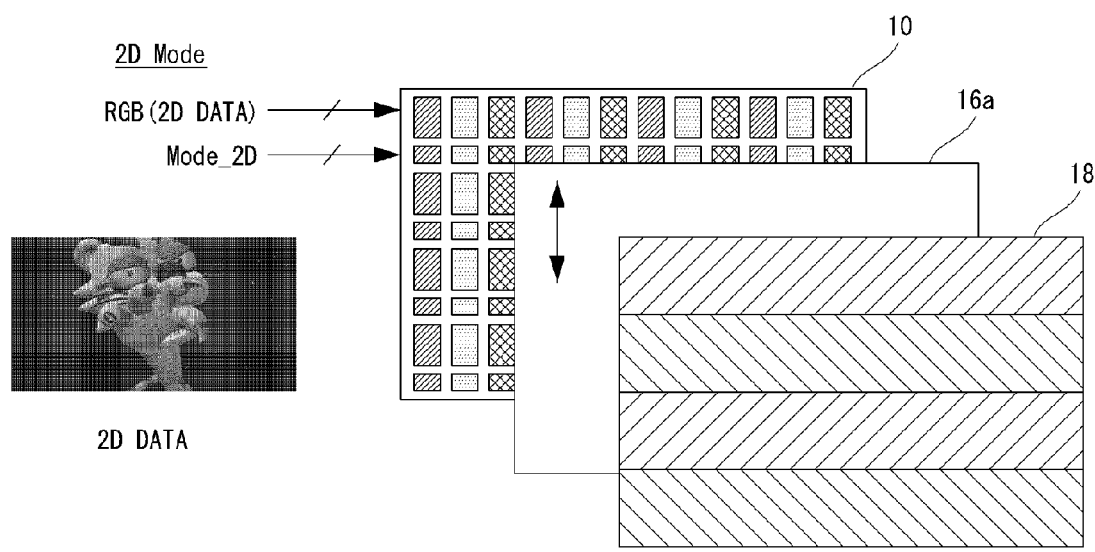
FIG. 16 schematically illustrates an operation of the image display device in a 2D mode.

FIG. 16 schematically illustrates an operation of the image display device in the 2D mode Mode_2D.

As shown in FIG. 16, in the 2D mode Mode_2D, the same RGB image is displayed on the main subpixels and the subsidiary subpixels of the display panel 10. The RGB image displayed on the subsidiary subpixels plays a role in increasing the luminance of the 2D image.

Figure 17:
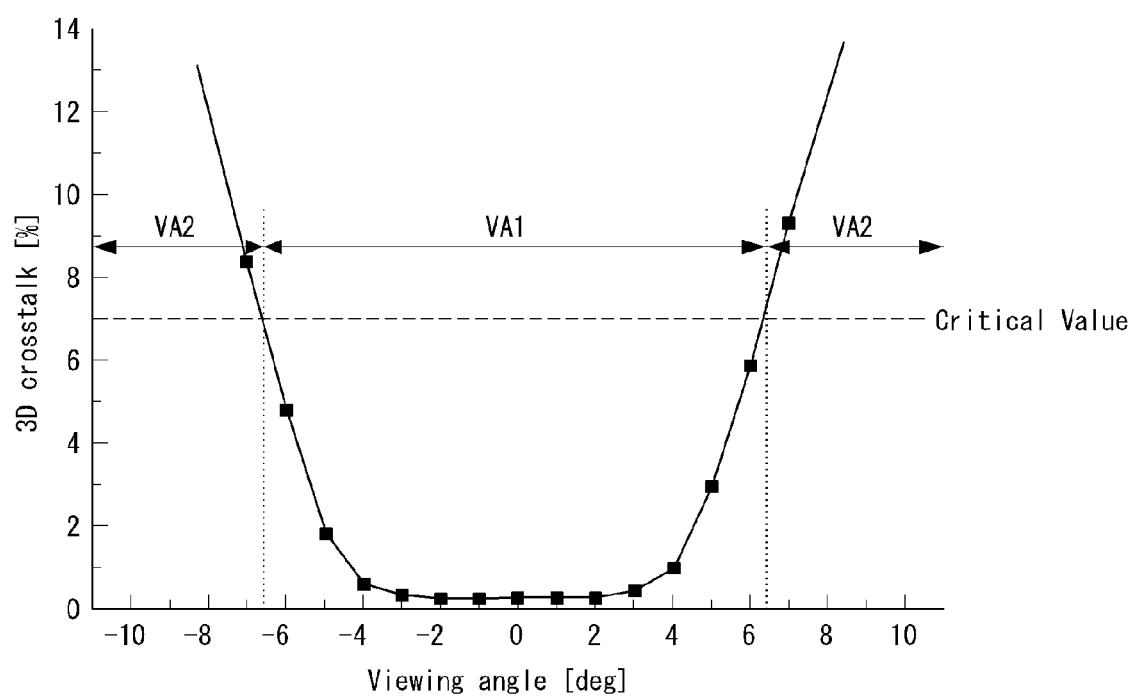
FIG. 17 is a graph illustrating a crosstalk value of a 3D image based on a 3D viewing angle.

FIG. 17 is a graph illustrating a crosstalk value of the 3D image based on the 3D vertical viewing angle. In FIG. 17, a horizontal axis indicates upward (+) and downward (−) viewing angles (unit: degree) of the 3D image, and a vertical axis indicates a 3D crosstalk value (unit: %).

In an image display device including a display panel, which alternately displays a left eye image and a right eye image in units of one horizontal line, and a patterned retarder, which is spaced apart from the display panel at a predetermined distance and changes polarization characteristics in units of one horizontal line, the left eye image has to pass through only a left eye retarder of the patterned retarder and the right eye image has to pass through only a right eye retarder of the patterned retarder so as to implement a 3D image with good image quality. However, when the user observes the 3D image not in front of the image display device but at a location of vertical viewing angle, the left eye image may pass through the right eye retarder as well as the left eye retarder and the right eye image may pass through the left eye retarder as well as the right eye retarder. Hence, a 3D crosstalk C/T is generated. The 3D crosstalk C/T may be represented by following Equation 1:

$$C/T[\%] = \frac{L_{Black}R_{White} - \text{Black}}{L_{White}R_{Black} - \text{Black}} \times 100 \qquad \text{[Equation 1]}$$

In Equation 1, '$L_{Black}R_{White}$' is a luminance value of a pattern displaying a black image on left eye pixels and a white image on right eye pixels, '$L_{White}R_{Black}$' is a luminance value of a pattern displaying the white image on the left eye pixels and the black image on the right eye pixels, and 'Black' is a luminance value measured after the black image is displayed on all the pixels. In general, a viewing angle obtained when the 3D crosstalk value C/T calculated by Equation 1 is equal to or less than about 7% is defined as the 3D vertical viewing angle capable of implementing the 3D image with the good image quality. As a result, the 3D crosstalk value C/T of about 7% is a critical value for determining the 3D vertical viewing angle capable of implementing the good 3D image. The critical value of about 7% may vary depending on models of the image display device.

As indicated by the graph of FIG. 17, the user may view the 3D image of the good image quality within a vertical viewing angle range VA1 in which the 3D crosstalk value is equal to or less than a previously determined critical value (for example, about 7%). On the other hand, the user may not view the 3D image of the good image quality within a vertical viewing angle range VA2, in which the 3D crosstalk value is greater than the previously determined critical value, because of an overlap between the left and right eye images.

Figure 18:
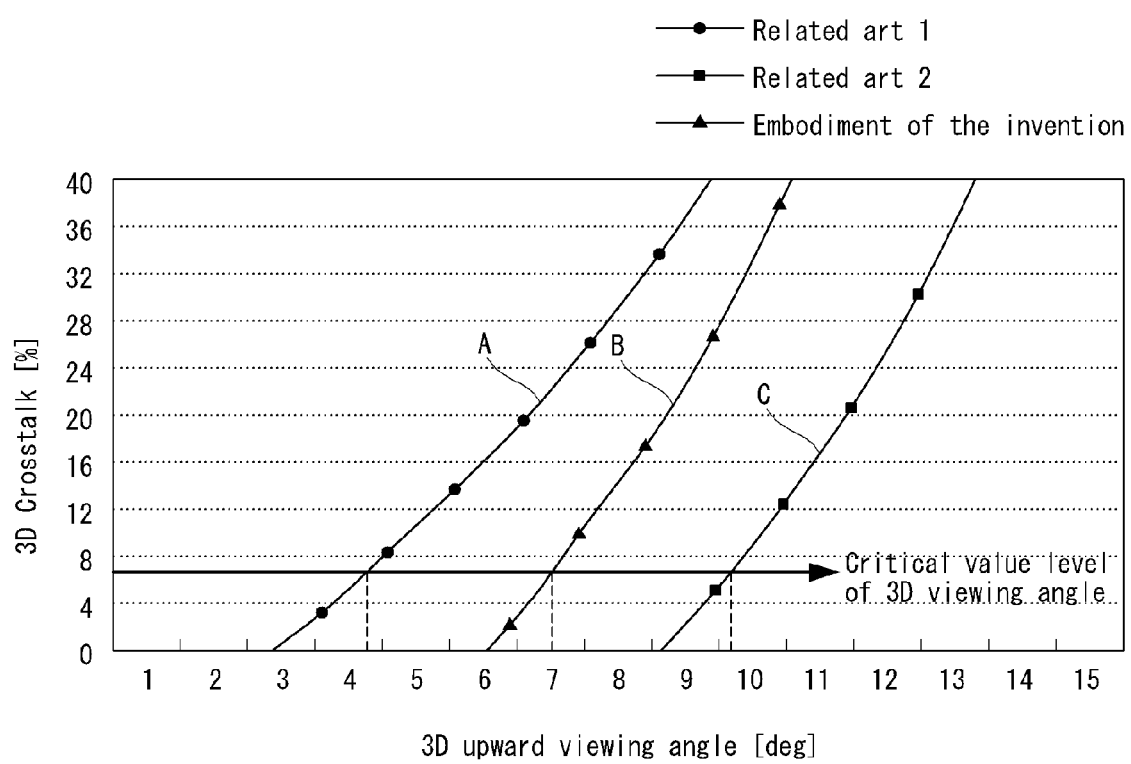
FIG. 18 is a graph illustrating a comparison between a vertical viewing angle of a 3D image according to an example embodiment of the invention and a vertical viewing angle of a 3D image in related arts.

FIG. 18 is a graph illustrating a comparison between an upward viewing angle of the 3D image according to the example embodiment of the invention and an upward viewing angle of a 3D image in the related arts. In FIG. 14, a horizontal axis indicates the upward viewing angle (unit: degree) of the 3D image, and a vertical axis indicates a crosstalk value (unit: %) of the 3D image.

In FIG. 18, a graph 'A' indicates an upward viewing angle of the related art 1, in which left and right eye images have a display interval of about 80 μm by black matrixes and a patterned retarder does not have a black stripe. According to the graph 'A' illustrating the related art 1, the upward viewing angle satisfying the critical value (for example, about 7%) of the 3D crosstalk is about 0° to 4° and is very narrow. A graph 'C' indicates an upward viewing angle of the related art 2, in which left and right eye images have a display interval of about 80 μm by black matrixes and a patterned retarder has a black stripe pattern with a width of about 210 μm. According to the graph 'C' illustrating the related art 2, the upward viewing angle satisfying the critical value (for example, about 7%) of the 3D crosstalk is about 0° to 10° and relatively widens. However, in the related art 2, the visibility and the luminance of the 2D image are reduced because of the presence of the black stripe pattern for securing the viewing angle.

On the other hand, in the embodiment of the invention, the display interval between the left eye image and the right eye image of the 3D image can be sufficiently secured without a separate black stripe pattern. Thus, as indicated by a graph 'B' of FIG. 18, the upward viewing angle satisfying the critical value (for example, about 7%) of the 3D crosstalk may increase to about 0° to 7° without reducing the visibility and the luminance of the 2D image.

As described above, the image display device according to the example embodiment of the invention can improve the visibility of both the 2D and 3D images and prevent the luminance reduction of the 2D image, in particular, when implementing the 2D image.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An image display device comprising:
    a display panel including a plurality of subpixels to selectively configure a 2D image and a 3D image; and
    a patterned retarder separating the light incident from the display panel into a first polarization component and a second polarization component,
    wherein, the subpixel includes a main subpixel, a subsidiary subpixel and a control TFT for controlling a display gray level of the subsidiary subpixel,
    the main subpixel comprising a first liquid crystal cell, a first switch TFT switching on or off a current path between a data line and the first liquid crystal cell in response to a kth scan pulse which is supplied by a kth gate line, and a first storage capacitor formed by an overlap between a first common line, to which a first common voltage is applied, and a pixel electrode of the first liquid crystal cell,
    the subsidiary subpixel comprising a second liquid crystal cell, a second switch TFT switching on or off a current path between the data line and the second liquid crystal cell in response to the kth scan pulse, and a second storage capacitor formed by an overlap between a second common line, to which a second common voltage is applied, and a pixel electrode of the second liquid crystal cell,
    the control TFT switching on or off a current path between the second common line and the second storage capacitor in response to a (k+1)th scan pulse which is supplied by a (k+1)th gate line, so as to control display gray level of the subsidiary subpixel,
    when configuring the 2D image, the first and second common voltage are applied with the same DC voltage level, and when configuring the 3D image, the first common voltage is applied with the DC voltage level, and the second common voltage is applied with a different voltage level from the first voltage.

2. The image display device according to claim 1, wherein the second common voltage swings between predetermined voltage levels with reference to the first common voltage in configuring the 3D image.

3. The image display device according to claim 1, wherein when configuring the 2D image, the main subpixel and subsidiary subpixel continuously display the same 2D image in response to the Kth scan pulse,
    when configuring the 3D image, the main subpixel continuously displays the 3D image in response to the Kth scan pulse and the subsidiary subpixel displays the 3D image in response to the Kth scan pulse and a black gray level in response to the (K+1)th scan pulse, under control of the control TFT.

4. The image display device according to claim 1, wherein the gate electrodes of the first and second switch TFT are connected to the kth gate line, and the gate electrode of the control TFT is connected to the (k+1)th gate line.

5. The image display device according to claim 1, wherein when configuring the 3D image, the second storage capacitor boosts the voltage level of the pixel electrode of the second liquid crystal cell with the (k+1)th gate line being activated.

6. The image display device according to claim 1, wherein the display panel includes an upper substrate being formed a common electrode, to which the first common voltage is applied, and a lower substrate, and the first and second common lines are formed on the lower substrate.

7. The image display device according to claim 6, further comprising:
    a holding capacitor, connected between the drain electrode of the control TFT and the common electrode, which uniformly holds the second common voltage on the second common line.

8. The image display device according to claim 6, wherein the common electrode forms a vertical electric field along with the pixel electrodes of the first and second liquid crystal cells.

9. The image display device according to claim 1, wherein the first and second liquid crystal cells are driven in a normally white mode.

10. The image display device according to claim 7, wherein the control TFT and the holding capacitor are formed in a non-display area where no image is displayed.

11. The image display device according to claim 10, wherein a ratio of the vertical pitch of the subsidiary subpixel to a vertical pitch of the main subpixel is 1:2.

12. A method of driving an image display device, in which a subpixel including a main subpixel and a subsidiary subpixel and a control TFT for controlling display gray level of the subsidiary subpixel are included, and the main subpixel including a first liquid crystal cell, the subsidiary subpixel including a second liquid crystal cell, the method comprising:

when configuring a 2D image:
applying a first and second common voltage with the same DC voltage level, the first common voltage being applied to a common electrode, and the second common voltage being applied to one terminal of a storage capacitor of the subsidiary subpixel via the control TFT;
switching on the switch TFTs of both the main subpixel and subsidiary subpixel in response to a Kth scan pulse which is supplied by a kth gate line, so as to allow a 2D image to be displayed on both the main subpixel and subsidiary subpixel; and
switching off the switch TFTs of both the main subpixel and subsidiary subpixel and switching on the control TFT in response to a (k+1)th scan pulse which is supplied by a (k+1)th gate line, so as to allow a 2D image to be continuously displayed on both the main subpixel and subsidiary subpixel; and
when configuring a 3D image:
applying the first and second common voltage, the first common voltage being applied to the common electrode, and the second common voltage being applied to one terminal of a storage capacitor of the subsidiary subpixel via the control TFT, wherein the first common voltage is a DC voltage level, and the second common voltage is a different voltage level from the first voltage;
switching on the switch TFTs of both the main subpixel and subsidiary subpixel in response to the Kth scan pulse, so as to allow a 3D image to be displayed on both the main subpixel and subsidiary subpixel; and
switching off the switch TFTs of both the main subpixel and subsidiary subpixel and switching on the control TFT in response to the (k+1)th scan pulse, so as to allow a 3D image to be continuously displayed on the main subpixel, and allow a black image to be displayed on the subsidiary subpixel.

13. The driving method according to claim 12, wherein the second common voltage swings between predetermined voltage levels with reference to the first common voltage in the step of configuring the 3D image.

14. The driving method according to claim 12, wherein when configuring the 3D image, the storage capacitor of the subsidiary subpixel boosts the voltage level of the pixel electrode of the second liquid crystal cell with the (k+1)th gate line being activated.

15. The driving method according to claim 12, wherein the common electrode forms a vertical electric field along with the pixel electrodes of the first and second liquid crystal cells.

16. The driving method according to claim 12, wherein the first and second liquid crystal cells are driven in a normally white mode.

* * * * *